United States Patent
Vovos et al.

(10) Patent No.: US 12,269,350 B2
(45) Date of Patent: Apr. 8, 2025

(54) COMMON-MODE CURRENT SENSING SYSTEM AND PROTECTION METHOD FOR POWER CONVERTERS

(71) Applicant: BAE Systems Controls Inc., Endicott, NY (US)

(72) Inventors: Robert J. Vovos, Vestal, NY (US); Andrew S. Clark, Binghamton, NY (US)

(73) Assignee: BAE Systems Controls Inc., Endicott, NY (US)

( * ) Notice: Subject to any disclaimer, the term of this patent is extended or adjusted under 35 U.S.C. 154(b) by 129 days.

(21) Appl. No.: 18/141,068

(22) Filed: Apr. 28, 2023

(65) Prior Publication Data
US 2024/0359561 A1     Oct. 31, 2024

(51) Int. Cl.
  *H02M 1/12*       (2006.01)
  *B60L 3/00*       (2019.01)
  *B60L 50/51*      (2019.01)

(52) U.S. Cl.
  CPC ............. *B60L 3/003* (2013.01); *B60L 3/0069* (2013.01); *B60L 50/51* (2019.02); *H02M 1/123* (2021.05); *B60L 2210/42* (2013.01)

(58) Field of Classification Search
  CPC ........ B60L 3/003; B60L 50/51; B60L 3/0069; B60L 2210/42; H02M 1/123
  See application file for complete search history.

(56) References Cited

U.S. PATENT DOCUMENTS

| | | | |
|---|---|---|---|
| 5,877,926 A | 3/1999 | Moisin | |
| 7,298,803 B2 | 11/2007 | Alexander | |
| 7,894,169 B2 * | 2/2011 | Valdez | H02H 3/17 361/42 |
| 9,007,790 B2 * | 4/2015 | Dillig | H02H 7/1216 363/51 |
| 9,071,164 B2 | 6/2015 | Schroeder et al. | |
| 9,236,828 B1 * | 1/2016 | Wei | H02P 27/08 |
| 10,361,628 B2 * | 7/2019 | Nagaoka | H02M 3/155 |

(Continued)

OTHER PUBLICATIONS

International Search Report, PCT/US2024/024577, mailed Jun. 14, 2024, 9 pages.

*Primary Examiner* — Thienvu V Tran
*Assistant Examiner* — Yahveh Comas Torres
(74) *Attorney, Agent, or Firm* — Scully, Scott, Murphy & Presser Gary McFaline (57) ABSTRACT

A common-mode current sensor system and method for a traction inverter of an electric hybrid vehicle. The system and method detects/reduces excess common-mode currents that can be caused by the presence of alternating current (AC)-chassis type short circuit faults at the outputs of an inverter used for driving a two or more-phased load. In an embodiment, the system detects the presence of an AC-chassis fault of any varying strength, e.g., weak, medium, hard, in respective parallel paths. The system and method can isolate a particular AC-chassis type fault to a particular phase leg of the inverter thereby obviating a need of having to shut-down and/or re-program each phase leg of the whole power supply and vehicle operation. Rather, upon detecting a chassis short, a fault signal is asserted to control shutting down of one or more inverter switches without having to shut-down the vehicle or negatively impact the vehicle status.

17 Claims, 6 Drawing Sheets

(56) References Cited

U.S. PATENT DOCUMENTS

| | | |
|---|---|---|
| 2005/0099743 A1 | 5/2005 | Lee |
| 2009/0296289 A1* | 12/2009 | Valdez ............... H02H 3/17 |
| | | 361/47 |
| 2011/0234126 A1 | 9/2011 | Meyer, III |
| 2011/0249368 A1 | 10/2011 | Andersen |
| 2013/0235618 A1* | 9/2013 | Dillig ............... H02H 7/1216 |
| | | 363/16 |
| 2015/0377646 A1 | 12/2015 | Meyer et al. |
| 2019/0225088 A1* | 7/2019 | Masuda ............... B60L 53/00 |
| 2021/0341544 A1* | 11/2021 | Vovos ............... H02M 1/36 |
| 2023/0327453 A1* | 10/2023 | Yu ............... H02M 1/123 |
| | | 307/82 |
| 2023/0400530 A1* | 12/2023 | Ives ............... H02P 29/024 |

* cited by examiner

COMMON-MODE CURRENT SENSING SYSTEM AND PROTECTION METHOD FOR POWER CONVERTERS

FIELD OF THE DISCLOSURE

This disclosure relates to power converters for vehicles such as battery electric vehicles and hybrid electric vehicles. More particularly, this disclosure relates to a common-mode current sensing system and method for preventing damage to components in an inverter caused by an electric machine being shorted or its cables being shorted to chassis.

BACKGROUND

Battery electric vehicles and hybrid electric vehicles have an electric machine such as a permanent magnetic electric machine electrically connected to an inverter. The electric machine is also mechanically connected to wheel axle(s) or turbine of the vehicle via a one or more mechanical connections and further connected to power alternating current (AC) accessory drives (inverters), e.g., air compressors, air conditioners and power steering etc.

A low voltage battery in the vehicle provides a first voltage. The first voltage is used to seed a primary or main power supply for the inverter. The main power supply generates a plurality of gate driver rails used to power two or more gate driver circuits to drive pairs of semiconductor switches. The pairs of semiconductor switches are connected in a h-bridge configuration between a high voltage DC bus (DC+ and DC−). The inverter may have one or more pairs of the semiconductor switches.

The low voltage battery is also used to seed a plurality of control power rails used to control the inverter. The inverter may also comprise a propulsion control unit such as a primary controller. The primary controller may receive torque and/or speed command(s) from another controller and generate commands to the gate driver circuitry. The torque and/or speed command(s) from this controller may be received via a communication interface, such as CAN. The control power rails provide power for the primary controller and the communication interface.

In normal operation and when the vehicle is ON, the primary controller and communication interface, receive the respective control power rails, which are in a predetermined range, and supplies the appropriate command to the gate driver circuits. The gate driver circuits, which are supplied with the gate driver rails, controls the gates of the semiconductors switches to turn ON/OFF to control the electric machine (a controlled state).

With respect to gate driver circuits, these circuits typically include a gate driver controller integrated circuit (IC) coupled to associated gate driver signal processing circuits that all receive power supply rail voltages generated from an associated power supply rail unit and provide the signals for controlling switching operations of the power transistors.

One issue involving the operation of the inverter is the possibility of AC chassis faults, e.g., when one of the phases that is isolated from chassis loses its isolation from chassis. This may happen, for example, when insulation, e.g., on a motor winding or insulation of a cable going to the motor, fails and the primary conductor short circuits to its shield or possibly shorts to the chassis of the box or the motor. This phenomenon affects common-mode capacitors in the inverter that hold the inverter stable relative to chassis, so the electronics are centered relative to chassis.

In certain inverter implementations, under normal operating conditions, the stray common mode signal current due to parasitics can range anywhere from 1 kHz-100 MHz at 200 amperes peak. In existing inverter circuits, typically common-mode capacitors are current-rated to handle these normal operations.

However, as a result of a potential soft or hard short-circuit faults, e.g., a chassis fault instance where the output phase is short circuited to the chassis ground, there can be induced an event greater amount of common-mode current into the system that can wreck havoc upon/damage the switches and common-mode capacitors. For example, such a fault causes excess common-mode current flow through the "DC voltage bus" common mode portion of the inverter circuit and back to the inverter that can cause damage to: the inverter, the wiring, the common-mode capacitors.

While existing circuits detect DC faults in the DC voltage bus, particularly by sensing induced common-mode voltages, it would be highly desirable to detect and reduce/eliminate the excess common-mode current that can be caused by alternating current (AC)-chassis type faults and in particular, provide the ability to detect and identify the presence of an AC-chassis fault at a particular inverter of a multi-inverter system. It is also desirable in a multi-inverter system to detect the individual inverter with the fault instead of shutting down the entire system.

SUMMARY

In a traction inverter, e.g., of a hybrid vehicle, a system and method for detecting and reducing/eliminating excess common-mode current that can be caused by alternating current (AC)-chassis type faults.

In one embodiment, the system and method detects and identifies the presence of an AC-chassis fault to a particular inverter of a multi-inverter system thereby obviating a need of having to shut-down and/or re-program the whole power supply of the vehicle when a fault is found.

In one embodiment, the system and method can detect and identify the presence of an AC-chassis fault to a particular inverter of a multi-inverter system by sensing and detecting the induced common-mode current waveform at the inverter's AC output.

Accordingly, disclosed is a system comprising a sensor for sampling a common-mode current signal present at an inverter driving a load at two or more phases. A first sensor path receives the sampled common-mode current signal for detecting a first type of fault of a current magnitude persisting for a first time duration; a second sensor path receives the sampled common-mode current signal for detecting a second type of fault, the second type of fault being of a current magnitude less than the current magnitude of the first type of fault and persisting for a second time duration greater than the first time duration; and a third sensor path receives the sampled common-mode current signal for detecting a third type of fault, the third type of fault of a current magnitude greater than the current magnitude of the second type fault and persisting for a time duration less than the second time duration of the second type of fault; and a controller for terminating operation of the inverter responsive to detecting one of the first type of fault, second type of fault or third type of fault.

In a further aspect, a method is provided. The method comprises: sampling, at a current sensor device, a common-mode current signal present at an inverter driving a load at two or more phases; receiving, at a first sensor path, the sampled common-mode current signal for detecting a first type of fault of a current magnitude persisting for a first time duration; receiving, at a second sensor path, the sampled common-mode current signal for detecting a second type of fault, the second type of fault being of a current magnitude less than the current magnitude of the first type of fault and persisting for a second time duration greater than the first time duration; receiving, at a third sensor path, the sampled common-mode current signal for detecting a third type of fault, the third type of fault of a current magnitude greater than the current magnitude of the second type of fault and persisting for a time duration less than the second time duration of the second type of fault; asserting, at one of the first sensor path, the second sensor path or the third sensor path, a corresponding first fault signal, second fault signal or third fault signal for receipt at a control device depending upon the detecting a corresponding first type of fault, second type of fault or third type of fault; and terminating, using the control device, operation of the inverter responsive to receiving the asserted one of the first fault signal, second fault signal or third fault signal.

Embodiments of the invention will be described in more detail below, by way of illustrative and non-limiting examples, with reference to the accompanying drawings.

DETAILED DESCRIPTION

In accordance with aspects of the disclosure, a common-mode sensing system and method is incorporated in a power conversion module of a vehicle system to protect the motor drive circuitry from unwanted AC chassis faults that can negatively impact performance of the drive motor, or at worst, destroy the switching inverter circuit driving the load.

In particular, a common-mode current sensing system is provided for detecting and reducing/eliminating excess common-mode current that can be caused by alternating current (AC)-chassis type faults at each respective individual phase leg of the operating inverter. The common-mode sensing system and method is implemented to detect multiple types of common-mode signals that can be present at the output of a power inverter that converts DC current to AC currents used to drive a machine or motor such as a vehicle motor. In one embodiment, upon detecting a type of common-mode current signal, the common-mode current sensing system responsively generates a response signal to protect gate drive circuitry driving the power inverter module(s).

Figure 1:
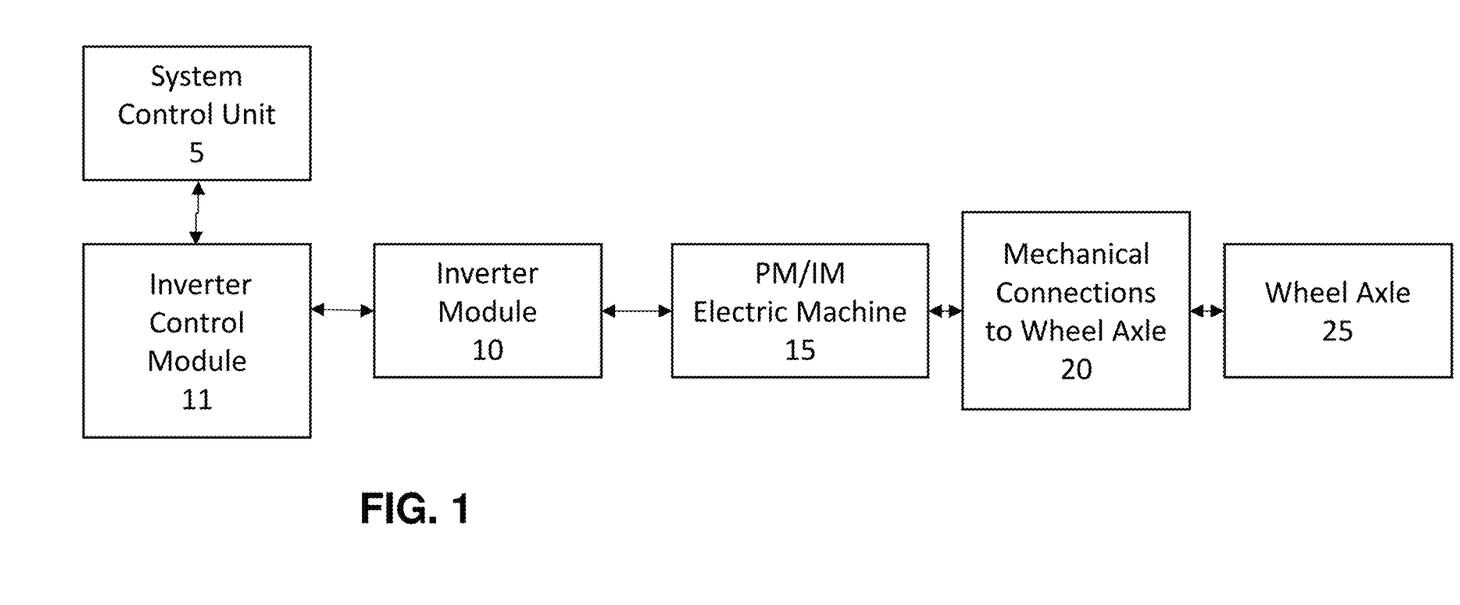
FIG. 1 illustrates an example of a vehicle system in accordance with aspects of the disclosure.

FIG. 1 illustrates an example of a vehicle system in accordance with aspects of the disclosure. In an embodiment, the vehicle system may be used in hybrid electric vehicle (HEV) or a battery electric vehicle (BEV). The vehicle may be a personal vehicle, such as a scooter, car, motorcycle and truck or a commercial vehicle such as a truck or bus, a maritime vehicle such as a boat or submarine or a military vehicle such as a tank, self-propelled artillery, or troop transport. The vehicle may also be an airplane, helicopter, UAV, and other powered air vehicles.

As shown in FIG. 1, the vehicle system may comprise a system control unit (SCU) 5, an inverter control module 11 for controlling one or more inverter modules 10, one or more permanent magnetic (PM) or Induction electric machines (IM) 15, mechanical connections 20 and the wheel axles 25 (and wheels). In a case of airplanes, helicopters, UAVs and other powered air vehicles the PM electric machine may be connected to a turbine (or other propulsion mechanism) and not a wheel axles.

In some aspects of the disclosure, the inverter control module 11 and inverter modules 10 may be part of a modular power control system (MPCS). A MPCS is a modular line replacement unit (LRU) containing a plurality of inverter modules and high voltage power distribution. The MPCS is scalable and customizable to have any number of inverter modules 10 and current interfaces. Different inverter modules may support and/or provide different phases of power. Each inverter module may have a wide bandgap switching unit having 3 or more phases of switching pairs. In some aspects of the disclosure, the wide bandgap switching unit 15 provide 3 phases. However, in other aspects, the wide bandgap switching unit 15 may provide 6 phases.

The control module 11 may control one or more inverter modules. In an aspect of the disclosure, the control module 11 may comprise one or more processors, memory and a communication interface. The communication interface may be control automation network (CAN) bus. The processor may be an FPGA. In other aspects of the disclosure, the processor may be a microcontroller or microprocessor or any other processing hardware such as a CPU or GPU. Memory may be separate from the processor (as or integrated in the same). For example, the microcontroller or microprocessor includes at least one data storage device, such as, but not limited to, RAM, ROM and persistent storage. In an aspect of the disclosure, the processor may be configured to execute one or more programs stored in a computer readable storage device. The computer readable storage device can be RAM, persistent storage, removable storage, or other non-transient computer readable mediums. A storage device is any piece of hardware that is capable of storing information, such as, for example without limitation, data, programs, instructions, program code, and/or other suitable information, either on a temporary basis and/or a permanent basis.

The communication interface may also be other network interfaces such as an ETHERNET, serial such as ARINC 429, 422, 485 interfaces or a wireless interface.

The MPCS may also comprise other modules not described herein.

The SCU 5 may also comprise a processor, memory and a communication interface. The SCU 5 communicates with the inverter control module 11 that controls the inverter modules 10. The SCU 5 issues torque/speed commands to the inverter control module 11 based on requests from an operator such as a driver of the vehicle via one or more inputs. The control module 11 receives these commands and generates corresponding control command for the respective inverter modules 10 and transfer the corresponding control commands to the inverter modules 10 such as via CAN.

The PM/IM electric machine(s) 15 may be surface permanent magnet electric machines, interior permanent magnet electric machines or induction electric machines.

The PM/IM electric machine 15 may be connected to the wheel axle(s) 25 (or turbine) via one or more mechanical connections 20. For example, the PM/IM electric machine 15 may be connected via a transmission, a drive shaft and a differential. The transmission may include a single or multiple gears. In other aspects of the disclosure, the PM/IM electric machine 15 may be included in an e-axle and the drive shaft may be omitted.

In some aspects of the disclosure, the inverter module(s) 10 and the PM/IM electric machine(s) 15 may be connected via cables. In other aspects of the disclosure, the PM/IM electric machine(s) 15 and the inverter module(s) may be integral.

Figure 2:
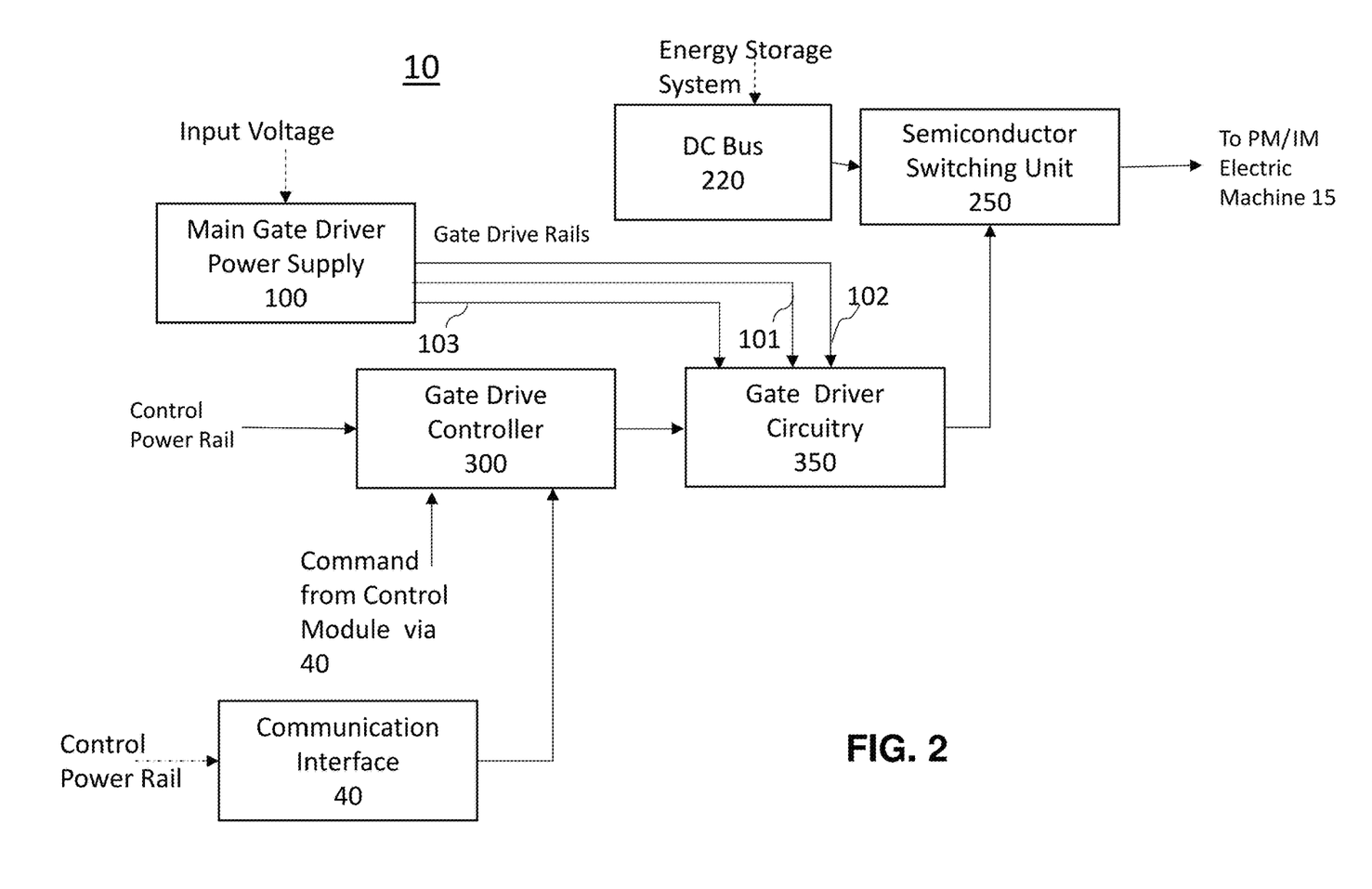
FIG. 2 illustrates an example of an inverter module including power supply and gate driver circuitry protected in accordance with aspects of the disclosure.

FIG. 2 illustrates an example of a portion of an inverter module 10 in accordance with aspects of the disclosure. The inverter module 10 may comprise a main gate driver power supply 100, a DC bus 220 that receives power from an energy storage system, e.g., a battery (not shown), a semiconductor switching unit 250 for driving the PM/IM electric machine 15, a gate drive controller 300 (primary controller), gate driver circuitry 350, and a communication interface 40.

Figure 3:
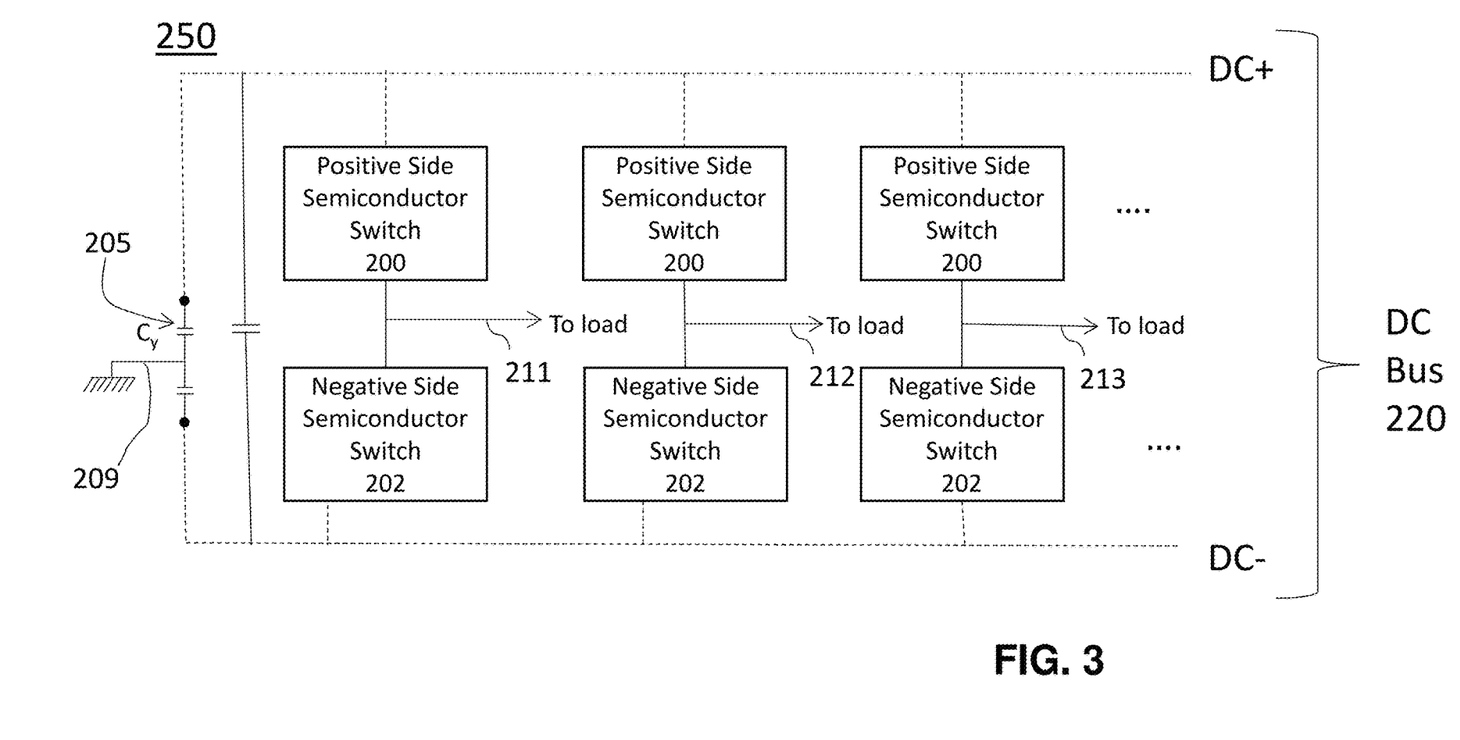
FIG. 3 illustrates an example semiconductor switching unit in accordance with aspects of the disclosure.

As shown in FIG. 3, the semiconductor switching unit 250 comprises a plurality of pairs of semiconductor switches. Each pair of semiconductor switches 200, 202 is connected in a H bridge configuration between a positive DC rail and a negative DC rail of a DC bus 220. The pairs of semiconductor switches comprise a positive side semiconductor switch 200 (connected to the positive rail DC+) also referred to herein as HIGH and the negative side semiconductor switch 202 (connected to the negative rail DC−) also referred to herein as LOW.

The number of pairs of semiconductor switches 200, 202 depends on the number of phases supported by the inverter module 100. For example, for an inverter module 100 supporting a single phase 211, there may be a single leg having a single pair of semiconductor switches 200, 202. However, for an inverter module 10 supporting three-phases 211, 212, 213, there may be three pairs of switches 200, 202 each pair on a respective phase leg. Multiple phases may be independently output to an electric machine. In other aspects, the phases may be connected in parallel such that one output is supplied (one terminal).

The phases 211, 212, 213 from the wide bandgap switching unit 250 may be connected in parallel. For example, the three phases from 3 pairs of wide bandgap semiconductor switches may be connected in parallel to provide a single phase. The current root mean square (RMS) for the single phase may be set as needed per a specific application. In some aspects of the disclosure, the single phase may be connected to an electric machine such as a traction motor. In some aspects of the current may be up to about 1125 A RMS (for the single phase).

In other aspects of the disclosure, the inverter module may provide three separate phases where the current in each phase may also be set as needed per the specific application. The three-phases may be used for an electric machine such as an integrated starter generator/motor (ISGM). In some aspects of the disclosure, the current in each phase may be up to 375 A RMS.

The semiconductor switches 200, 202 may be transistors such as Insulated-gate bipolar transistors (IGBT) or field effect transistors (FETS). For example, the FETs may be wide bandgap semiconductor such as, but not limited to, silicon carbide (SiC) or gallium nitride (GaN). The switching frequency of the semiconductor switches 200, 202 may be application specific and designed to achieve a target power.

As further shown in FIG. 2, the main gate driver power supply unit 100 provides gate drive rail voltages 101, 102, 103 for use by the gate driver circuitry 350 in the power inverter module 10.

In an embodiment, the main gate driver power supply 100 is seeded by a low voltage power (identified in the figures as "Input Voltage"), supplied either directly or indirectly via an external low voltage battery. The external low voltage battery may be a starting, lighting and ignition battery (SLI). In an embodiment, the control power rails include a voltage(s) for the gate drive controller 300, a voltage for the communication interface 40, etc. In some aspects of the disclosure, the SLI voltage may also be a control power rail.

The main gate driver power supply 100 provides a plurality of power rail for the gate driver circuitry 350 (gate drive rails). The connections to and within the plurality of main gate driver power supplies may be based on the number of pairs of semiconductor switches 200, 202 and the configurations thereof. For example, when there are three sets of pairs, such as three phases, e.g., u, v, w, the pairs may be separately driven and independent or connected in parallel.

When the three sets of pairs are separately driven, there may be six independent and separate main gate driver power supplies, e.g., one per separately driven semiconductor switch. In other aspects, when the three sets of pairs are connected in parallel, there may be only two independent and separate supplies, three are connected together and share current (LOW and HIGH).

As further shown in FIG. 2, the main gate driver power supply 100 is seeded by a low voltage (input voltage). This input voltage may be an SLI voltage or a voltage boost therefrom ("Vboost"). The input voltage is applied to a power converter element (not shown) which may be an open loop peak charge converter with post-regulation. In some aspects, the power converter may comprise a transformer, rectifiers, filters, capacitance and a linear regulator operating to output a preset voltage that can be regulated to provide target gate drive rails (voltages). In an aspect of the disclosure, there may three voltage rails 101, 102 and 103 of values set by a voltage regulator circuit (not shown) which may be a precision shunt regulator adjustable to customize the rails (gate drive rails) as needed.

The specific values of the gate drive rails may be based on the gate driver circuitry 350. In some aspects of the disclosure, the second rail 102 may provide a reference such that when the first rail 101 is referred to in the following description it is the voltage between the first rail 101 and the second rail 102 (difference) (HIGH); and when the third rail 103 is referred to in the following description it is the voltage between the third rail 103 and the second rail 102 (difference) (LOW). The separate rails 101, 102, 103 are maintained by capacitors (not shown) between the first rail 101 and the second rail 102 and capacitance between the second rail 102 and the third rail 103. In some aspects of the disclosure, the first rail 101 and third rail 103 are set to drive the gates of the semiconductor switches 200, 202. In a parallel configuration supporting a single-phase power inverter driving operation the gate drive power supplies two (one highside, one lowside) independent isolated, e.g., +15V/−5V power supply rails respectively, to support the paralleled (sharing switching losses, shared conduction losses) driving of the semiconductor switching (SiC MOSFET, GaN FET, IGBT).

Figure 4:
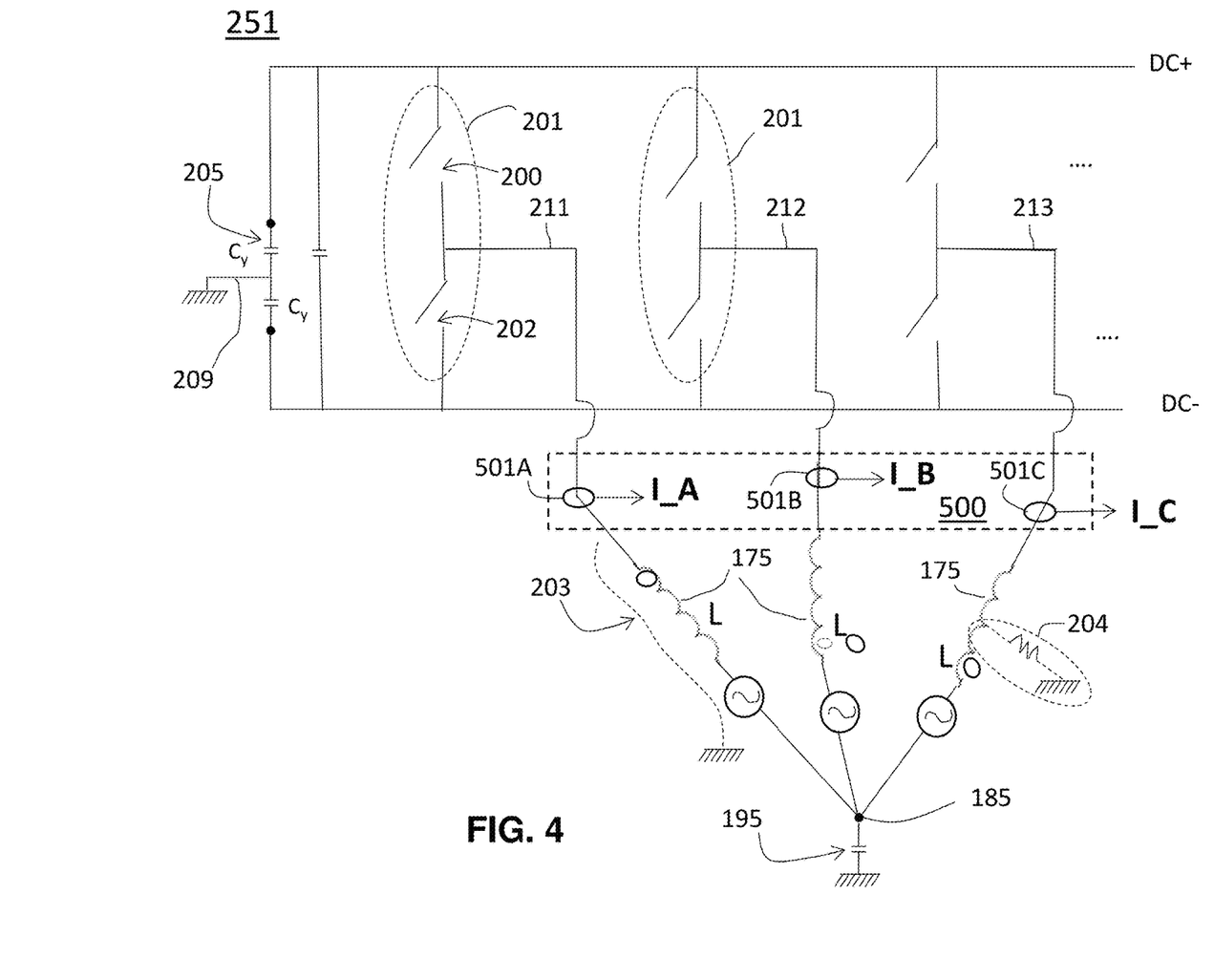
FIG. 4 shows a more detailed block diagram of a semiconductor switching unit or inverter configured for driving a three-phase load according to embodiments of the invention.

FIG. 4 shows a more detailed schematic diagram 251 of a semiconductor switching unit or inverter 250 of FIG. 3, shown configured for driving a three-phase load, e.g., for controlling an RPM of a machine or vehicle motor. In FIG. 4, the three-phase switching unit includes three phase legs 211, 212, 213, with each leg having a corresponding configuration of a pair 201 of controllable semiconductor transistor switches 200, 202, each pair 201 operated for driving a single phase output to a three-phase load. Depending upon the switching configuration of transistors 200, 202 current at any output leg can flow into or out of the connected load shown as inductive loads 175 of a motor or machine, e.g., inductive load of value "L" (e.g., corresponding to stator windings of a motor). In the circuit configuration of FIG. 4, a respective common-mode capacitor $C_y$ 205 connects each respective power rail, i.e., the respective DC+, DC-bus rails to chassis ground 209 in order to apply the common mode voltage generated by the inverter on to the passive motor or load. In other words, common mode capacitors $C_y$ 205 stabilize the DC voltage bus portion 230 around chassis so as to minimize common mode voltage present on the inverter DC bus. The control of the switch pair 201 to achieve a certain switching frequency or motor RPM is by applying pulse width modulated (PWM) control signals by the gate driver circuitry 350 to control the output drive signal characteristic (e.g., magnitude) of the switches 200, 202 at switching unit 250. That is, the motor switching frequency is the frequency obtained by the PWM signals controlling the switching transistors 200, 202. However, given imbalances in the components and the switching controls, and presence of any parasitics, a load neutral point 185 (e.g., neutral point at the motor) where the three phase output voltages are summed, can exhibit voltage swings at the switching frequency depending upon the configuration of the switching transistor pairs 201.

For example, in the circuit configuration of FIG. 4, a stray or parasitic capacitance, $C_p$, represented by capacitor 195, connects the output load neutral point 185 to chassis ground 209. This capacitive connection to chassis ground at the load neutral point 185 can induce circulating current or common-mode current back into the system.

Figure 5:
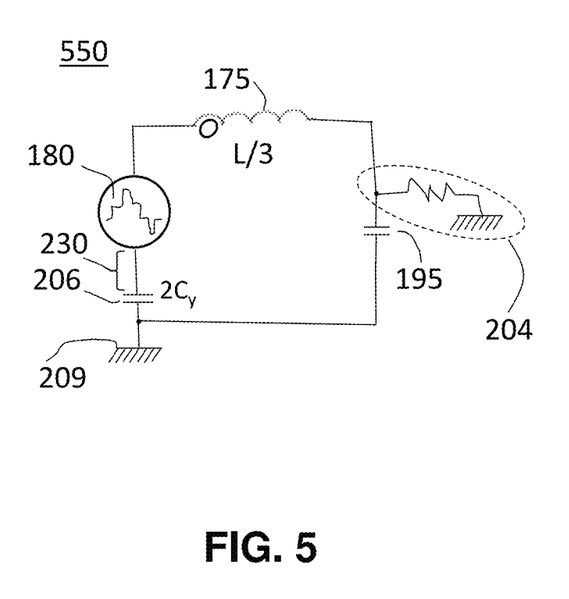
FIG. 5 shows an equivalent electrical circuit model of the inverter system of FIG. 4 depicting the induced common-mode current signal waveform due to the presence of parasitics under normal operations.

FIG. 5 shows an equivalent electrical circuit model 550 of the inverter system 251 of FIG. 4 depicting the induced common-mode current signal waveform 180 due to the presence of parasitics under normal operations. As shown, the common-mode signal waveform 180 is a stairstep waveform at the switching frequency as controlled by the PWM signals and present through each load depicted as an inductive load of value L/3 in series with common-mode capacitor 206 having twice the capacitor value of the common-mode capacitor 205, i.e., a value of $2C_y$. This circulating current 180 will also create a magnet field that can produce interference and impact EMC.

As shown in FIG. 5, in normal operation, due to parasitic capacitive effects depicted as an equivalent capacitor 195 connected to chassis, the common-mode current, which ideally is the summation of the generated currents of each phase and sums to zero current, may normally exhibit a bit of ringing effect at the PWM switching frequency (e.g., 1-5 MHz at 200 Amp peak waveforms).

However, given the myriad types of possible AC chassis faults 203 possible, e.g., hard shorts to chassis ground, weak shorts, shorted winding motor cable, mismatched components of a badly designed machine, etc., there is corresponding different amounts of common-mode current that can flow through a particular phase leg.

Figure 6:
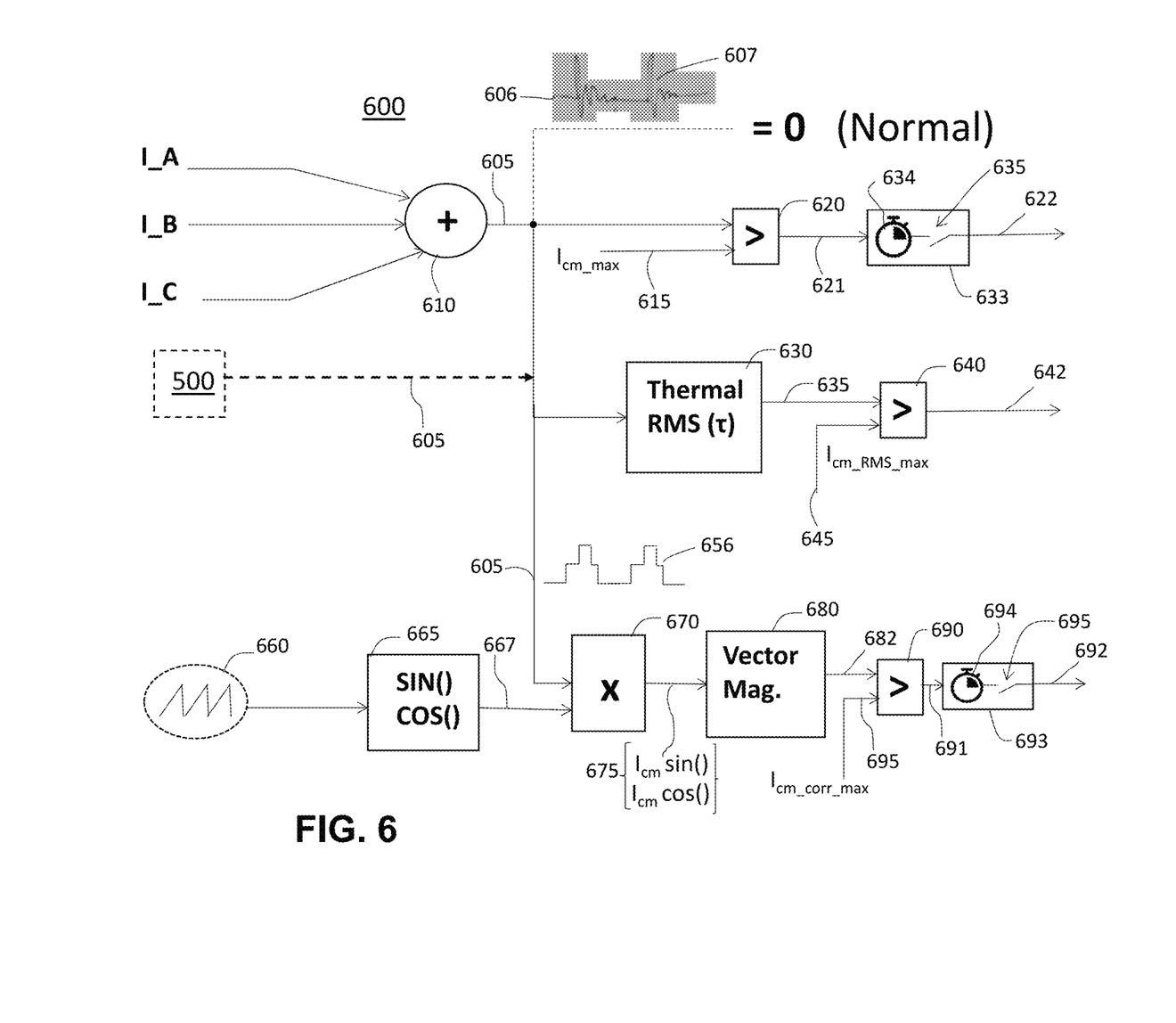
FIG. 6 depicts an embodiment of a common-mode detection circuit configured to connect to the output phase legs of the inverter switching circuit for detecting a type of AC chassis fault according to embodiments of the present invention.

FIG. 6 depicts an embodiment of a common-mode detection circuit 600 that is configured to connect to the output phase legs of the inverter switching circuit for detecting a type of AC chassis fault that produces unwanted or excess common-mode current.

Returning to FIG. 4, in an aspect of the disclosure, the inverter switch module 251 makes use of current feedback network 500 at each phase leg of the inverter that senses the common-mode current at each phase leg of the load, (e.g., three phase machine) and detects an amount of current at each phase leg in determining whether an AC or DC fault exists at that leg. In embodiments, the common mode current is measured as the sum of two (2) to "n" individual current sensors, one current sensor per phase. Alternatively, there is implemented a single common mode sensor (not shown) configured for measuring all of the phase currents at each leg 211, 212, 213 to provide a single summed common-mode current signal that can be input to the detection circuit of FIG. 6. Current sensors can be implemented with shunts, hall effect sensors, Rogowski coils or other current sensing technologies. As shown in FIG. 4, the current feedback network 500 includes a respective current sensor 501A, 501B, 501C at each respective phase leg 211, 212, 213 for sensing the common-mode current waveform (i.e., a summation of current outputs at each leg) of the inverter that is being supplied to a respective phase load. The current sensor circuits 501A, 501B, 501C for each phase leg 211, 212, 213, provides a respective raw current sample I_A, I_B and I_C representing the common-mode current that is monitored in accordance with aspects of the invention. In embodiments, such current measurement sensors obtain current samples at a sample rate ranging anywhere from sub-microseconds to microseconds and the individual current sensors may obtain samples of currents ranging anywhere from tens to thousands of amperes.

FIG. 6 illustrates a common-mode current sensor circuit 600 that analyzes the sensed common-mode current signal output of the inverter. In an embodiment, common-mode current sensor circuit 600 analyzes a summation of the sampled common-mode current waveforms at each phase leg of the inverter according to an aspect of the invention. The common-mode current sensor circuit 600 includes a signal summation device 610 for receiving each respective sensed sample of current flowing through a respective phase leg, i.e., a current sensor 501A, 501B, 501C will measure a sample of a respective raw current flow I_A, I_B and I_C through each of the three respective current phase legs 211, 212, 213 to provide representative common-mode current. The sampling rate and sampling duration of the sensed sample of common-mode current is configurable depending upon a type of fault to be detected, e.g., hard/fast vs. weaker/slow and ranges anywhere from between sub-microseconds to microsecond sampling rates. The summation device 610 receives and sums each measured sampled currents at the phase legs and the system is programmed to run a method that processes the summed sensed current values of each of the phase legs against a series of thresholds. Alternatively, in the instance that current feedback network 500 implements a single current sensing device to obtain a single sample representing all three-phase inverter output currents at a sample period, the produced common-mode current signal sample 605 is input directly to the common-mode current sensor circuit 600 for processing.

In an embodiment, under normal operation, the summed sampled raw sensor common-mode current signals 605 is a value corresponding to (an average of) zero amps, i.e., a signal 606 of no appreciable common-mode current except of the damped ringing 606 repeating at the PWM frequency. This signal 606 is indicative of normal expected operating conditions.

In an embodiment, the common-mode current sensor circuit 600 is configured with a first path configured to detect an extreme (hard) fault, e.g., a hard short at fast duration indicative of a hard/fast AC chassis fault to chassis ground. At this first parallel path, there is configured a first detection threshold that, when exceeded, indicates an extreme-type fault. Such an extreme-type fault will generate an extreme amount of common-mode current, e.g., greater than 100 Amps, at a quick, fast duration, e.g., on the order of microseconds. Thus, in order to detect such a hard, fast fault, the summed raw currents I_A, I_B and I_C providing inverter common-mode current flow 605 is input to a comparator device 620 that compares the sensed current flow 605 against a maximum threshold current amount value $I_{cm\_max}$ 615, which amount, if exceeded, for a detection period of microseconds, would be indicative of a hard, fast AC chassis fault. That is, this fault detection scheme would sense a common-mode current amperage that is indicative of a hard, fast fault and a faulty phase leg condition at that inverter which would warrant immediate generation of a hard/fast fault signal 621. The generated hard/fast fault signal 621 could initiate a control to turn off the inverter device and cease inverter operation if the fault persists for a pre-determined amount of time. The value of comparator 620 input threshold signal $I_{cm\_max}$ 615 can be a value ranging anywhere from between 10 amps to 100 amps at a sampling duration of, for example, 1 microsecond to 100 microseconds, e.g., detecting common-mode current greater than 50 amps for 10 microseconds. To detect that the existence of a fault at a phase leg persists for a threshold amount of time, e.g., 10 microseconds, the output 621 of the comparator is timed against a threshold time period by a counter or timer 634 at a persistence timer block 633 to ensure that the existence of the faulty current meets a threshold persistence criteria to signify a fault at that inverter phase leg. If the detected fault signal 621 persists or exceeds a threshold time period, timer block 633 closes switch 635 in order to provide a fault signal 622 used to disable the switching of only that inverter, i.e., all phases are shut down at that inverter. Other operating inverters at the DC bus still maintain operation.

In an embodiment, the common-mode current sensor circuit 600 is configured with a second parallel path configured to detect a weak (soft) fault, e.g., a weak AC chassis fault such as overheating common-mode capacitors at slow duration. At this second parallel path, there is configured a further threshold that indicates an emerging entry into or existence of a weak or slow common-mode current fault, e.g., such as caused by a potential overheating of the common-mode capacitors 205 (Cy). Such a fault will be detected as an amount of summed common-mode current, e.g., less than 25 Amps, at a slower sampling duration, e.g., on the order of seconds. In this embodiment, in order to detect such a weak, slower fault (in seconds), the sampled, summed raw currents I_A. I_B and I_C providing inverter common-mode current flow 605 is further input to a root-mean-square filter device 630 that converts the summed sensor sampled current flow 605 into an RMS (root-mean-square) signal value 635 based on the thermal capability (thermal rating) of the common-mode capacitors 205 (Cy).

That is, in this embodiment, the applied RMS time constant (RMS tau) at RMS filter converter 630 is tuned to the thermal time constant ($\tau$) of the common-mode capacitors 205 implemented in the system design and can be on the order of seconds. Thus, the resulting thermal RMS signal value 635 converted from the summed signal 605 matches the thermal amperage rating of the common-mode capacitors, e.g., 20 amperes. The resultant RMS signal value 635 is thus able to detect a potential overheating of the common-mode capacitors 205 for a slow time period. The resulting converted RMS signal value 635 is then input into a further comparator device 640 that compares the converted sensed current value 635 against a further maximum threshold current amount value $I_{cm\_RMS\_max}$ 645, which amount, for example, 20 amperes, if exceeded, for a detection period of seconds, would be indicative of an emerging weak fault due to common-mode capacitor overheating. That is, this fault detection scheme would sense a common-mode current amperage that is indicative of a weak, slow fault and a weak/slow fault signal and in response, would generate a weak/slow fault signal 642 in a phase leg that could initiate a turning off the inverter device or taking of some other corrective action at the inverter device in order to prevent an overheating of the common-mode sensing capacitors. The value of comparator 640 threshold signal $I_{cm\_RMS\_max}$ 645 can range anywhere from between 10s amps to 100s amps but also at significantly less than the peak value, e.g., half the amplitude at a response time ranging from between seconds to minutes, e.g., detecting common-mode current greater than 20 amps for 1 second.

In a further embodiment, the common-mode current sensor circuit 600 is configured with a third parallel path configured to detect a typical medium-type fault, e.g., a bad winding connection, or a resistive connection 204 to chassis ground. For example, insulation breaks down gradually and does not allow for a low impedance connection as current may have to jump a gap between the main conductor and the shield or chassis through insulation and air gap. This arcing is often high impedance leading to a steady but reduced magnitude overload. In such a scenario, the common-sense current waveforms 605 follows the shape of the common mode voltage, i.e., square or stairstep wave currents 656 develop that toggle at the PWM rate used to generate the drive signal for an output phase signal. FIG. 6 shows a shape of the detected current 656 that follows the common-mode voltage. This detected current 656 is sampled at the current sensors at a much greater rate (e.g., on the order of Megahertz) than the PWM carrier pulse repetition rate (e.g., a fundamental cycle on the order of 10-20 kHz) used for generating the output phase signal at that leg. In an embodiment, at this third parallel leg, there is configured a further threshold that indicates a fault somewhere in-between a weak/slow common-mode sense current fault and a hard/fast common-mode sense current fault which can be due to a resistive connection to chassis ground.

In an embodiment, the actual PWM carrier signal 660 is input to a first mixer circuit 665 for mixing the actual PWM carrier signal 660 with one or more orthogonal sinusoidal signals, e.g., sin ( ) and cos ( ) signals. That is, processing block 665 applies respective orthogonal sin ( ) and cos ( ) signals to the PWM carrier signal 660. The resulting orthogonal sin ( ) and cos ( ) signals 667 of the PWM carrier is then multiplied at a second multiplier or mixing circuit 670 with the detected sampled common-mode square wave current 656 to produce a respective sin ( ) or cos ( ) signal vector quantity of the common-mode square wave current 656. The resultant common-mode current vector signals $I_{cm} \sin(\ )\ I_{cm} \cos(\ )$ 675 represent a correlation between the sampled common-mode square wave current 656 and the sin ( ) and cos ( ) of the PWM carrier signal 660. For example, given an example PWM of 20 kHz, such a resistive fault to chassis 204, the zero sum common-mode signal may result in an increase of 20 kHz (PWM current) signal content in the common mode signal.

In this embodiment, the common-mode current vector signals $I_{cm} \sin(\ )\ I_{cm} \cos(\ )$ 675 are processed by a vector magnitude detector 680 in order to determine the magnitude of the PWM correlated vector signal 675. The resultant vector magnitude signal 682 is thus representative of the sensed common mode current 605 when an AC chassis fault exists. A fault would be indicated by 20 kHz PWM content which would appear as DC magnitude in signal 682 whereas parasitic currents at other frequencies would appear as AC ripple in signal 682. This sensed vector magnitude signal 682 is then input into a further comparator device 690 that compares the sensed vector magnitude signal 682 against a further maximum threshold current amount value $I_{cm\_corr\_max}$ 695, which amount, if exceeded or persists, for a pre-determined detection period of greater than microseconds (e.g., 100 microseconds) yet less than seconds, e.g., milliseconds, would be indicative of a medium-type fault due to, for example, a resistive connection to chassis. In an embodiment, to detect that the existence of a fault at a phase leg persists for a threshold amount of time, e.g., microseconds, the output 691 of the comparator 690 is timed against a threshold time period by a counter or timer 694 at a persistence timer block 693 to ensure that the existence of the faulty current meets a threshold persistence criteria to signify a fault at that inverter phase leg. If the detected fault signal 691 persists or exceeds a threshold time period, e.g., 100 μsec-500 μsec, then timer block 693 closes switch 695 in order to provide a fault signal 692 used to disable the switching of only that inverter, i.e., all phases are shut down at that inverter. Other operating inverters at the DC bus still maintain operation.

This fault detection scheme of FIG. 6, would sense a common-mode current amperage that is indicative of a medium fault-detected as between a hard/fast and a weak/slow fault and in response, would generate a fault signal 692 in a phase leg that could initiate a turning off the inverter device or taking of some other corrective action at the inverter device in order to prevent any damage to the driving system. The value of comparator 690 threshold signal $I_{cm\_corr\_max}$ 695 can range anywhere from between 10s amps to 100s amps but with a persistence between the slow and the fast time. For example, the response time can be set between 2 times (2×) to 10 times (10×) the PWM period. For an example PWM of 20 kHz (=1/20 kHz=50 μsec), then a suitable example sampling period would range from between 100 μsec to 500 μsec, e.g., detecting common-mode current greater than 25 amps for 250 microseconds.

In each of the embodiments, the respective threshold values, i.e., $I_{cm\_max}$ 615, $I_{cm\_RMS\_max}$ 645, and $I_{cm\_corr\_max}$ 695 are set based upon the test data of the vehicle and the traction inverter hardware that is running.

In embodiments, should a common-mode sensing comparator output signal 622, 642 or 692 declare a fault, i.e., output signals 622, 642 or 692 indicate a common-mode sensing current failure, then these signals are processed by the inverter control module 11 to shut down the inverter device sourcing those currents, i.e., stop the power conversion at the switches 201 of each phase leg 211, 212, 213 at that inverter. On a system level, the power switches 201 will be stopped from toggling and a fault state signal is reported over the CAN interface bus to the system controller module 11 (FIG. 1) to report a specific (hard, medium or soft) AC ground fault depending upon the respective common-mode sensing comparator output signal 622, 642 or 692 asserted. Thus, upon detecting a chassis short, a fault signal is asserted to control shutting down an inverter without having to shut-down the whole power supply, or at least, minimize any impact at the vehicle. The type of AC ground fault can be recorded for future troubleshooting/maintenance purposes.

In the discussion and claims herein, the term "about" indicates that the value listed may be somewhat altered, as long as the alteration does not result in nonconformance of the process or device. For example, for some elements the term "about" can refer to a variation of ±0.1%, for other elements, the term "about" can refer to a variation of ±1% or ±10%, or any point therein. For example, the term about when used for a measurement in mm, may include +/0.1, 0.2, 0.3, etc., where the difference between the stated number may be larger when the state number is larger. For example, about 1.5 may include 1.2-1.8, where about 20, may include 18.0-22.0.

As used herein, the term "substantially", or "substantial", is equally applicable when used in a negative connotation to refer to the complete or near complete lack of an action, characteristic, property, state, structure, item, or result. For example, a surface that is "substantially" flat would either completely flat, or so nearly flat that the effect would be the same as if it were completely flat. "Substantially" when referring to a shape or size may account for manufacturing where a perfect shapes, such as circular or sizes may be difficult to manufacture.

As used herein terms such as "a", "an" and "the" are not intended to refer to only a singular entity, but include the general class of which a specific example may be used for illustration. As used herein, terms defined in the singular are intended to include those terms defined in the plural and vice versa.

References in the specification to "one aspect", "certain aspects", "some aspects" or "an aspect", indicate that the aspect(s) described may include a particular feature or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

For purposes of the description hereinafter, the terms "upper", "lower", "right", "left", "vertical", "horizontal", "top", "bottom", and derivatives thereof shall relate to a device relative to a floor and/or as it is oriented in the figures or with respect to a surface.

Reference herein to any numerical range expressly includes each numerical value (including fractional numbers and whole numbers) encompassed by that range. To illustrate, reference herein to a range of "at least 50" or "at least about 50" includes whole numbers of 50, 51, 52, 53, 54, 55, 56, 57, 58, 59, 60, etc., and fractional numbers 50.1, 50.2 50.3, 50.4, 50.5, 50.6, 50.7, 50.8, 50.9, etc. In a further illustration, reference herein to a range of "less than 50" or "less than about 50" includes whole numbers 49, 48, 47, 46, 45, 44, 43, 42, 41, 40, etc., and fractional numbers 49.9, 49.8, 49.7, 49.6, 49.5, 49.4, 49.3, 49.2, 49.1, 49.0, etc.

The terminology used herein is for the purpose of describing particular embodiments only and is not intended to be limiting the scope of the disclosure and is not intended to be exhaustive. Many modifications and variations will be apparent to those of ordinary skill in the art without departing from the scope and spirit of the disclosure.

What is claimed is:

1. A system comprising:
   a sensor for sampling a common-mode current signal present at an inverter driving a load at two or more phases;
   a first sensor path receiving the sampled common-mode current signal for detecting a first type of fault of a current magnitude persisting for a first time duration;
   a second sensor path receiving the sampled common-mode current signal for detecting a second type of fault, the second type of fault being of a current magnitude less than the current magnitude of the first type of fault and persisting for a second time duration greater than the first time duration; and
   a third sensor path receiving the sampled common-mode current signal for detecting a third type of fault, the third type of fault of a current magnitude greater than the current magnitude of the second type of fault and persisting for a time duration less than the second time duration of said second type of fault; and
   a controller for terminating operation of the inverter responsive to detecting one of said first type of fault, second type of fault or third type of fault;
   wherein the first sensor path for detecting the first type of fault comprises:
      a comparator for receiving said sampled common-mode current signal and comparing a magnitude of said sampled common-mode current signal against a first threshold value indicative of a strong short circuit failure; and
      a timer at said first sensor path, said timer for detecting persistence of said first type of fault for said first time duration.

2. The system as claimed in claim 1, wherein the second sensor path for detecting a second type of fault comprises:
   a thermal root-mean-square (RMS) converter for converting the sampled common-mode current signal into a thermal RMS common-mode current signal value; and
   a comparator for receiving said converted thermal RMS common-mode current signal and comparing a magnitude of said converted thermal RMS common-mode current signal against a second threshold value indicative of a weak short circuit failure.

3. The system as claimed in claim 2, wherein a time constant of said thermal RMS converter is based on a thermal rating of one or more common-mode capacitors at the machine.

4. The system as claimed in claim 1, wherein the third path for detecting a third type of fault comprises:
   a mixer device for multiplying the sampled common-mode current signal with one or more sinusoidal signals, the one or more sinusoidal signals having a frequency component commensurate with a pre-determined frequency of a pulse-width-modulated (PWM) signal used to control a signal characteristic of the inverter output.

5. The system as claimed in claim 4, further comprising:
   a mixer device for multiplying a PWM carrier signal against one or more sinusoidal signals to generate respective one or more vector signals.

6. The system as claimed in claim 5, wherein the one or more sinusoidal signals are orthogonal to each other.

7. The sense system as claimed in claim 6, wherein the one or more sinusoidal signals comprises: a sine signal, a cosine signal, or a combination of a sine signal and a cosine signal.

8. The system as claimed in claim 5, wherein the third path for detecting a third type of fault further comprises:
   a sensor device for obtaining a magnitude of a vector signal and providing a corresponding vector magnitude signal; and
   a comparator for receiving each said corresponding vector magnitude signal and comparing said corresponding vector magnitude signal against a third threshold value indicative of a resistive chassis ground failure.

9. The system as claimed in claim 8, further comprising:
a timer at said third sensor path, said timer for detecting persistence of said third type of fault for said third time duration, wherein said third time duration is greater than the first time duration.

10. A method comprising:
    sampling, at a current sensor device, a common-mode current signal present at an inverter driving a load at two or more phases;
    receiving, at a first sensor path, the sampled common-mode current signal for detecting a first type of fault of a first current magnitude persisting for a first time duration;
    receiving, at a second sensor path, the sampled common-mode current signal for detecting a second type of fault, the second type of fault being of a current magnitude less than the first current magnitude of the first type of fault and persisting for a second time duration greater than the first time duration;
    receiving, at a third sensor path, the sampled common-mode current signal for detecting a third type of fault, the third type of fault of a current magnitude greater than the current magnitude of the second type of fault and persisting for a time duration less than the second time duration of the second type of fault;
    asserting, at one of said first sensor path, said second sensor path or said third sensor path, a corresponding first fault signal, second fault signal or third fault signal for receipt at a control device depending upon the detecting a corresponding first type of fault, second type of fault or third type of fault; and
    terminating, using the control device, operation of the inverter responsive to receiving said asserted one of said first fault signal, second fault signal or third fault signal;
    wherein the detecting a second type of fault at the second sensor path comprises:
       converting, at a thermal root-mean-square (RMS) converter, the sensed common-mode current signal into a thermal RMS common-mode current signal value; and
       comparing, at a comparator, a magnitude of said converted thermal RMS common-mode current signal against a second threshold value indicative of a weak short circuit failure.

11. The method as claimed in claim 10, wherein the detecting a first type of fault at said first sensor path comprises:
    receiving, at a comparator, said sampled common-mode current signal; and
    comparing, at said comparator, said sampled common-mode current signal against a first threshold value indicative of a strong short circuit failure.

12. The method as claimed in claim 10, further comprising: detecting, using a timer at said first sensor path, a persistence of said first type of fault for said first time duration.

13. The method as claimed in claim 10, wherein a time constant of said thermal RMS converter is based on a thermal rating of one or more common-mode capacitors.

14. The method as claimed in claim 10, wherein the detecting a third type of fault at the third path comprises:
  multiplying, at a mixer device, the sampled common-mode current signal with one or more sinusoidal signals to generate one or more vector signals, the one or more sinusoidal signals having a frequency component commensurate with a pre-determined frequency of a pulse-width-modulated (PWM) signal used to control a signal characteristic of the inverter output.

15. The method as claimed in claim 14, further comprising:
  multiplying, at a further mixer device, a PWM carrier signal with one or more of: a sine signal, a cosine signal, or a combination of a sine signal and cosine signal to generate one or more said sinusoidal signals having the frequency component commensurate with the frequency of said PWM signal.

16. The method as claimed in claim 14, wherein the detecting a third type of fault further comprises:
  obtaining, at a sensor device, a magnitude of a vector signal and providing a corresponding vector magnitude signal; and
  comparing, at a comparator, each said corresponding vector magnitude signal against a third threshold value indicative of a resistive ground failure.

17. The method as claimed in claim 16, further comprising: detecting, using a timer at said third sensor path, a persistence of said third type of fault for said third time duration, wherein said third time duration is greater than the first time duration.

\* \* \* \* \*